United States Patent [19]

Kim

[11] Patent Number: 5,687,147
[45] Date of Patent: Nov. 11, 1997

[54] SERVO CONTROL METHOD AND APPARATUS FOR AN OPTO MAGNETIC DISC

[75] Inventor: See-Wean Kim, Seoul, Rep. of Korea

[73] Assignee: Daewoo Electronics Co., Ltd., Rep. of Korea

[21] Appl. No.: 563,062

[22] Filed: Nov. 27, 1995

[30] Foreign Application Priority Data

Nov. 28, 1994 [KR] Rep. of Korea .............. 94-31419

[51] Int. Cl.[6] .................................................. G11B 7/095
[52] U.S. Cl. .................................. 369/44.25; 369/44.26; 369/44.29; 369/44.35
[58] Field of Search ........................... 369/44.25, 44.26, 369/44.35, 44.36, 44.29, 44.28, 44.41, 44.32, 124, 13; 250/201.5

[56] References Cited

U.S. PATENT DOCUMENTS

| | | | |
|---|---|---|---|
| 4,243,848 | 1/1981 | Utsumi | 369/44.25 |
| 4,982,392 | 1/1991 | Soejima | 369/44.25 |
| 5,065,386 | 11/1991 | Takeya et al. | 369/44.35 X |
| 5,077,718 | 12/1991 | Matsushita | 369/44.35 X |

*Primary Examiner*—Thang V. Tran
*Attorney, Agent, or Firm*—Beveridge, Degrandi Weilacher and Young

[57] ABSTRACT

A servo control method and an apparatus for an opto-magnetic disc swiftly converts a servo control system corresponding to a changed area when a current servo area is abruptly changed while executing a servo control operation related to a specific area of the opto-magnetic disc by an optional servo system. A control section periodically detects that the current servo area is changed to a different are due to an external shock or excessive tracking operation while executing the servo control operation, and converts the current servo system into the servo system relevant to the changed area. Thus, the time required to resume the servo control operation is reduced when the servo area is abruptly changed during the servo operation by a servo control apparatus.

5 Claims, 5 Drawing Sheets

SERVO CONTROL METHOD AND APPARATUS FOR AN OPTO MAGNETIC DISC

BACKGROUND OF THE INVENTION

1. Field of the Invention

The present invention relates to a servo control method and apparatus for an opto-magnetic disc, and more particularly to a servo control method and apparatus for an opto-magnetic disc, in which a servo system is swiftly changed so as to execute servo control operation related to a changed area when an area, in which a servo control operation is executed (hereinafter, the area is designated "servo area"), is changed due to an external shock or due to excessive tracking operation while the servo apparatus executes servo control operation related to a specific area of an opto-magnetic disc by means of an optional servo system.

2. Description of the Prior Art

Currently, opto-magnetic discs from which information can be recorded and reproduced, are widely used. The opto-magnetic discs have been used widespreadly among general users using the opto-magnetic discs in a mini-disc player. A cartridge that has dimensions of 68[mm]×72[mm] ×5[mm] to retain a mini-disc, e.g., with a diameter of 64[mm], is loaded/unloaded to/from the mini-disc player. Accordingly, in the mini-disc player, the discs are handy to carry, and a user can use two types of recording media such as an optical disc exclusive to playback and an opto-magnetic disc to/from which information can be recorded and/or reproduced. In addition, the mini-disc player executes a random access function like a compact disc player and it can execute a 74-minute playback operation, by a data compression method, as if a compact disc were loaded therein even when a small-sized disc is loaded therein. Because of these reasons, the minidisc player has been used widespreadly.

Generally, an opto-magnetic disc includes two areas. One area is a program area having a plurality of predetermined information units such as popular songs recorded thereon, and the other area is a read-in area, called a "Table Of Contents" (hereinafter, referred to as "TOC") area that has address information thereon which is related to respective information recorded on the program area. The address information is a kind of management information which indicates a starting and ending position of the recorded information, as well as other information. In case that the information recorded on the program area is replaced by a user, a User TOC (hereinafter, referred to a "U-TOC") area for recording the management data related to the replaced information is assigned to either the outer side of the read-in area or to the inner circumference side of the program area.

Generally, both the read-in and program area of a pre-mastered mini-disc have data recorded thereon in the form of a pit. Whereas the read-in area of the opto-magnetic disc has information recorded thereon in the form of a pit, the program area has information recorded thereon in the form of a groove that has a wave.

Figure 1:
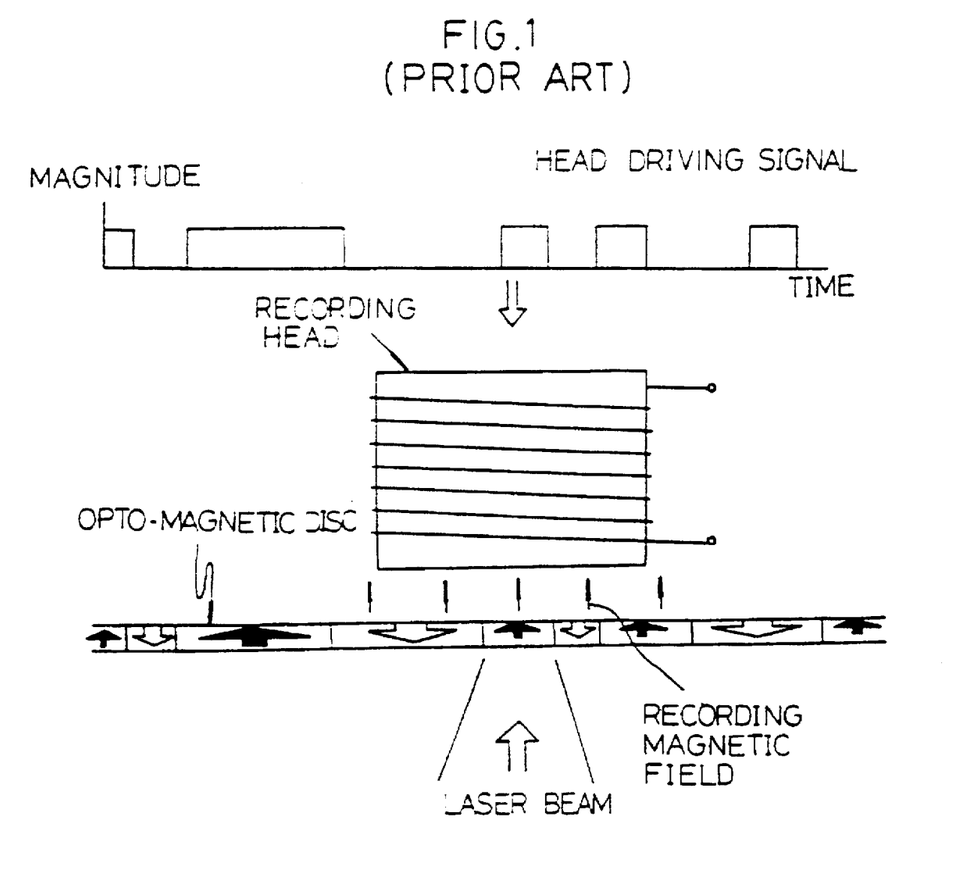
FIG. 1 is a view for illustrating a recording of information on an opto-magnetic disc in a general opto-magnetic disc reproducing apparatus.

FIG. 1 is a view for illustrating a recording of information on an opto-magnetic disc in a general opto-magnetic disc reproducing apparatus. A principle of recording the information on the opto-magnetic disc will be described with reference to FIG. 1. As illustrated, by using a laser apparatus that has an output power of approximately 4 mW, a laser beam is irradiated on a disc surface to raise the temperature of an optical spot portion up to the Curie temperature of about 180°. During the state that the temperature of the optical spot portion is raised to the Curie temperature, a recording apparatus applies a current that has a desired direction adapted for recording to a magnetic head which, in turn, creates a magnetic field to supply a record magnetic field to the opto-magnetic disc. While the opto-magnetic disc is rotated, the position of the optical spot portion on the opto-magnetic disc is relocated, and a sequential optical spot portion passes through under the magnetic head. The optical spot portion is cooled while retaining a magnetism in accordance with the polarity of the magnetic head. Consequently, upon inputting a driving signal into a recording head, the polarities of N and S are formed on a recording track surface of the disc.

When a laser beam is irradiated onto the disc surface by using a laser apparatus having an output power of approximately 0.6[mW] in order to reproduce the information from the above-described opto-magnetic disc, the reflection direction of the incident laser beam differs in accordance with the polarity of a magnetic material on the opto-magnetic disc. More specifically, in terms of the Kerr effect, a polarized plane of the laser beam incident onto the opto-magnetic disc is rotated in a prescribed direction (forward direction or backward direction) as much as 0.2–0.3° in accordance with the polarity of the magnetic material, and the laser beam passes through a polarizing beam splitter to be incident onto two light receiving devices, i.e., consisting of at least four photo diodes, which are installed with a predetermined gap between them. Once the laser beam reflected from the opto-magnetic disc is incident onto the set of light receiving devices, the light receiving devices provide signals which correspond to the polarities of the magnetic material on the opto-magnetic disc. Based on the signals from the light receiving devices, the reproducing apparatus converts the N and S polarities of the magnetic material on the opto-magnetic disc into data corresponding to "1" or "0" to read out the information.

In the operation in which information is reproduced from the opto-magnetic disc, the laser beam from the laser apparatus is focused on the opto-magnetic disc to detect servo error signals on the basis of the state of the laser beam which is converged on the photo diodes consisting of at least four elements, thereby judging whether or not the servo operation is normal. An example of the servo error detecting apparatus is disclosed in U.S. Pat. No. 5,079,757 issued to Wachi et al.

Figure 2:
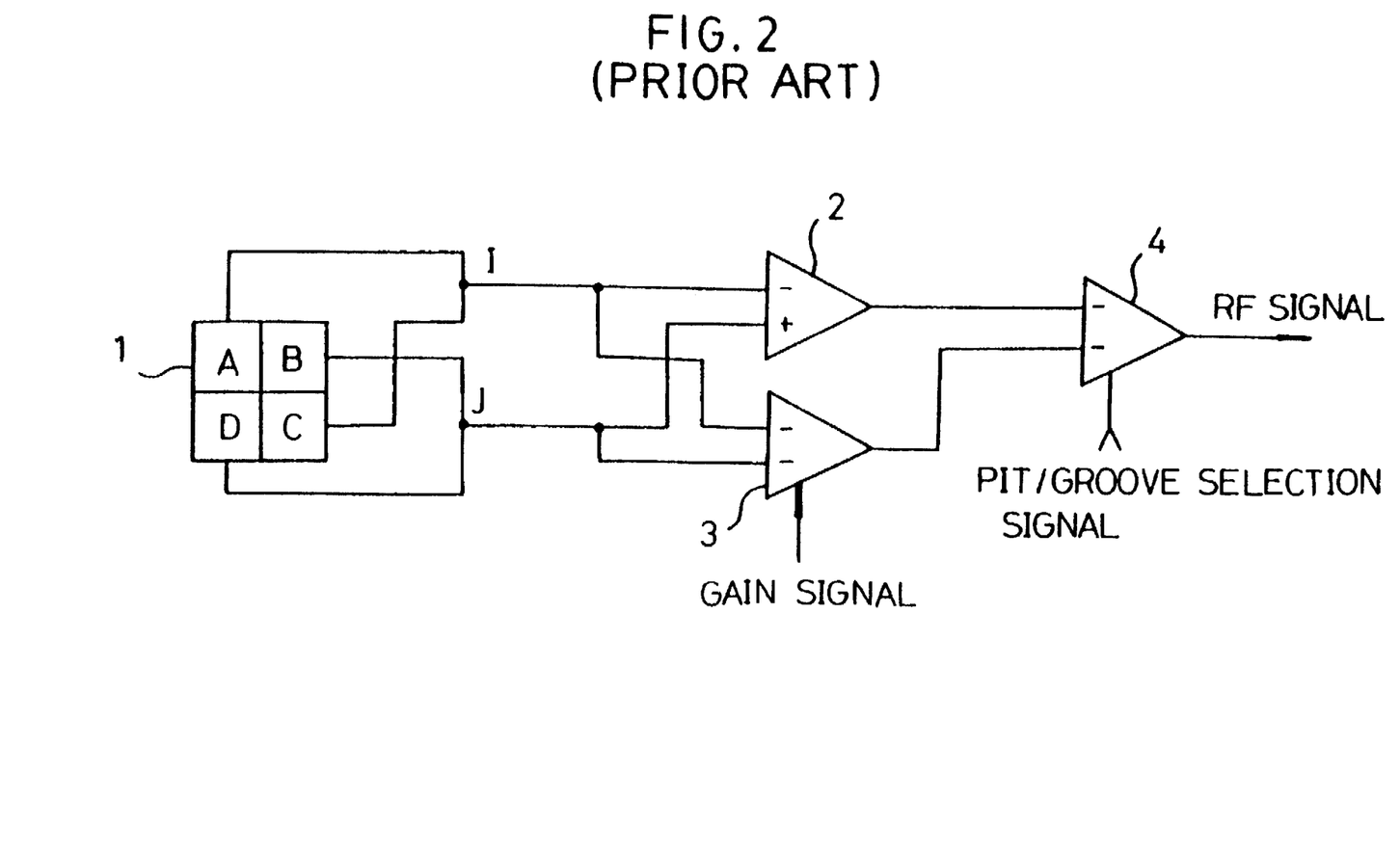
FIG. 2 is a circuit block diagram for illustrating a servo error detecting means for the general opto-magnetic disc.

FIG. 2 is a circuit block diagram for illustrating a servo error detecting means for the general opto-magnetic disc. A photo diode 1 having the structure of four divisions is utilized as the light receiving device, and a light receiving area thereof is divided into areas A, B, C and D. Assuming that the value of the sum of light receiving areas A and C is defined as I, and the value of the sum of light receiving areas B and D is defined as J, a first servo error detector 2 utilizes I and J values to detect a first servo error signal (e.g., a tracking error signal) in the program area formed in the groove pattern. A second servo error detector 3 is supplied with a gain control signal which differs in accordance with the disc to detect a second servo error signal (e.g., a focusing error signal) in the read area (read-in area) formed in the pit pattern on the basis of the I and J values. An amplifier 4 connected to the outputs of both first servo error detector 2 and second servo error detector 3, executes the operation of a kind of a gate which is enabled by receiving a pit/groove selection signal from a control section (not shown) to output, while selectively amplifying, the first and second servo error detection signals of first and second servo error detectors 2 and 3.

The operation of the foregoing servo error detecting apparatus of the opto-magnetic disc will be described as follows. While executing the servo control operation related to the read-in area, second servo error detector 3 maintains a gain of a predetermined level under the control of the control section. Namely, the predetermined gain signal is supplied from the control section as much as a difference of the reflectivity between the premastered (able to only reproduce) mini-disc and recordable/reproducible opto-magnetic disc to maintain the gain of a prescribed level. In this state, I and J values (I plus J value), based on the converging state of photo diode 1 consisting of four elements, are utilized to detect the servo error signal (e.g., the focusing error signal). The control section produces the pit selection signal in order to execute servo the control operation related to the read-in area, thereby enabling the operation of amplifier 4. In this state, amplifier 4 amplifies the second servo error detection signal from second servo error detector 3 to output an amplified second servo error detection signal which is a RF signal. A servo circuit connected to a post-stage of amplifier 4 controls the servo operation in the read-in area of the opto-magnetic disc to insure that it is accurately executed on the basis of the amplified servo error detection signal from amplifier 4.

When the control section executes the servo control operation related to the program area, first servo error detector 2 utilizes I and J values (I minus J value) based upon the converging state of photo diode 1, which has the structure of four divisions so as to detect the servo error signal (e.g., the tracking error signal). Then, amplifier 4 is enabled in accordance with the groove selection signal from the control section. In this state, amplifier 4 amplifies to output the second servo error detection signal from first servo error detector 2 during the servo control operation related to the program area. The servo circuit connected to the post-stage of amplifier 4 controls that the servo control operation related to the program area of the opto-magnetic disc is accurately executed on the basis of the amplified servo error detection signal which is the RF signal from amplifier 4.

If an external shock or excessive tracking operation occurs while the control section executes the servo control operation related to the program area, the servo controlled area is changed from the current program area to the read-in area. In this case, no signal is provided from amplifier 4. The servo control operation related to the program area denotes the state where the first servo error detection signal from first servo error detector 2 is applied to amplifier 4 which is enabled by the groove selection signal from the control section. In this state, while amplifier 4 is provided with the second servo error detection signal from second servo error detector 3, amplifier 4 blocks an output signal since it is not enabled by the pit selection signal related to the read-in area, so that the RF signal is not outputted from amplifier 4.

In case amplifier 4 has no output signal, the control section does not immediately recognize the current state as a wrong servo operation state. Namely, when there is no output signal from amplifier 4, the control section determines the current situation by receiving succeeding data of at least approximately 4~13 frames in the presently changed area. When the second servo error detection signal (I plus J signal) from second servo error detector 3 is inputted to the control section, the control section judges that the current servo area is moved to the read-in area having the data recorded thereon in the pit pattern. Accordingly, the control section moves an optical pickup to an innermost circumference portion of the read-in area, and reads out the management information recorded on the read-in area repeatedly from the beginning.

When a readout operation of the management information recorded on the read-in area is completed, the servo control apparatus jumps to a predetermined position of the program area on the basis of when reproducing information from the program area is stopped. The control section detects the position of a target track on the above position to continue to carry out the tracking operation in the target track.

In the conventional servo control apparatus for the opto-magnetic disc, the operation of the servo circuit is stopped when the servo circuit executes the servo control operation related to the read-in area, which is caused by an external shock or excessive tracking operation while executing the servo control operation related to the program area. Since the servo system of the servo apparatus is changed, and the servo control operation related to the read-in area is repeatedly executed from the beginning, a lot of time is required to resume the servo control operation.

As a result, it is needed to immediately convert the relevant servo system related to the read-in area when the servo controlled area is changed due to the external shock or the excessive tracking operation while the servo circuit is operated in the servo system related to the program area.

SUMMARY OF THE INVENTION

Therefore, it is a first object of the present invention to provide a servo control method for an opto-magnetic disc, by which the servo control operation related to a changed area is stably maintained, by immediately converting the servo system of the servo apparatus to the servo control operation related to the changed area, with sensing a state in which the servo system related to a present area is changed over to a servo system related to a different area while a servo control apparatus executes a servo control operation related to a program area of an opto-magnetic disc to/from which the information can be recorded and/or reproduced.

It is a second object of the present invention to provide a servo control method for an opto-magnetic disc, in which the servo control operation related to the changed area is stably maintained, in the case where a servo controlled area is detected to be changed as a result of checking the servo control operation, by periodically checking whether or not a servo controlled area is changed to a different area while a servo control apparatus executes a servo control operation related to a program area of an opto-magnetic disc to/from which the information can be recorded and/or reproduced.

It is a third object of the present invention to provide the servo control apparatus for the opto-magnetic disc that is adapted for executing the above-described servo control method.

In order to achieve the above-mentioned first object of the present invention, there is provided a servo control method for an opto-magnetic disc, which comprises the steps of:

(i) jumping a servo control apparatus to a first area for a predetermined time to execute a servo control operation related to an optional target track located in the first area;

(ii) detecting in the first area whether a predetermined signal is in a state in which a laser beam converges on a light receiving device by executing the servo control operation related to the first area, to output a first servo error signal;

(iii) judging whether or not a servo controlled area is changed from the first area to a second area while executing step (ii);

(iv) converting a servo system of the servo control apparatus into a servo system corresponding to the changed area when the servo area is changed in step (iii);

(v) maintaining the current servo system when the current servo area is not changed in step (iii); and (vi) judging whether or not the jumped position is the position of target track, repeatedly executing the operation after step (i) when the jumping position of the servo control apparatus is not the position of the target track, and executing an information playback operation in a corresponding position when the jumping position of the servo control apparatus is the position of the target track, Preferably, a readout operation of management information from the second area in the opto-magnetic disc is performed in the opto-magnetic disc reproducing apparatus before performing step (i). It is preferable that the first area is a program area having information recorded thereon and the second area is the read-in area having address information recorded thereon.

In order to achieve the above-mentioned second object of the present invention, there is provided a servo control method for an opto-magnetic disc, which comprises the steps of:

(i) judging whether or not a current servo area is a first area in an opto-magnetic disc reproducing apparatus;

(ii) judging whether or not the current servo area is a second area when it is determined that the current servo area is not the first area in step (i);

(iii) returning to step (i) when the current servo area is not the second area after step (ii), and setting a servo system related to the second area when it is determined that the current servo area is the second area in step (ii);

(iv) setting the servo system related to the first area when it is determined that the current servo area is the first area in step (i);

(v) detecting an area changeover state periodically while executing the servo control operation related to the corresponding area when the servo system is set after step (iv);

(vi) returning to step (i) when it is determined that the area is changed while executing the servo control operation in step (v), and controlling to repeatedly execute the operation after step (i); and vii) controlling to maintain the current system unchanged when the area is not changed while executing the servo control operation in step (v).

In order to achieve the above-mentioned third object of the present invention, there is provided a servo control apparatus for an opto-magnetic disc, which comprises:

a first servo error detector for detecting a first servo error signal in a first area on the basis of a converging state of a light receiving device;

a second servo error detector for inputting a gain control signal differential according to a kind of a disc and detecting a second servo error signal in a second area on the basis of a converging state of the light receiving device;

an amplifier for selectively amplifying the first and second servo error detection signals from the first and second servo error detectors and outputting an amplified first and second servo error detecting signals;

a comparator for detecting a level change of the second servo error detecting signal from the second servo error detector by means of a predetermined reference signal and producing a level change signal;

a clock oscillator for outputting a clock signal having a predetermined level for a predetermined time, by means of the level change signal from the comparator when the level change of the second servo error detector is detected; and a control section for applying a predetermined signal to enable the amplifier and controlling to convert a servo operation, currently executed, into a servo operation corresponding to a changed area when the area is changed while executing the servo control operation related to a specific area in the opto-magnetic disc.

Preferably, the clock signal from the clock oscillator is outputted in the range which is greater than 22T and smaller than 44T where T denotes the maximum pit length of the opto-magnetic disc.

According to the present invention, when an external shock or an excessive tracking operation causes the current servo area to change while the servo control operation is executed by a specific servo system in the servo control apparatus, a servo system is rapidly adjusted to the servo system related to the changed area.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

A description will be given below in detail, with reference to the accompanying drawings, of the circuitry configurations, and the operations of a servo control method and apparatus for an opto-magnetic disc according to an embodiments of the present invention.

Figure 3:
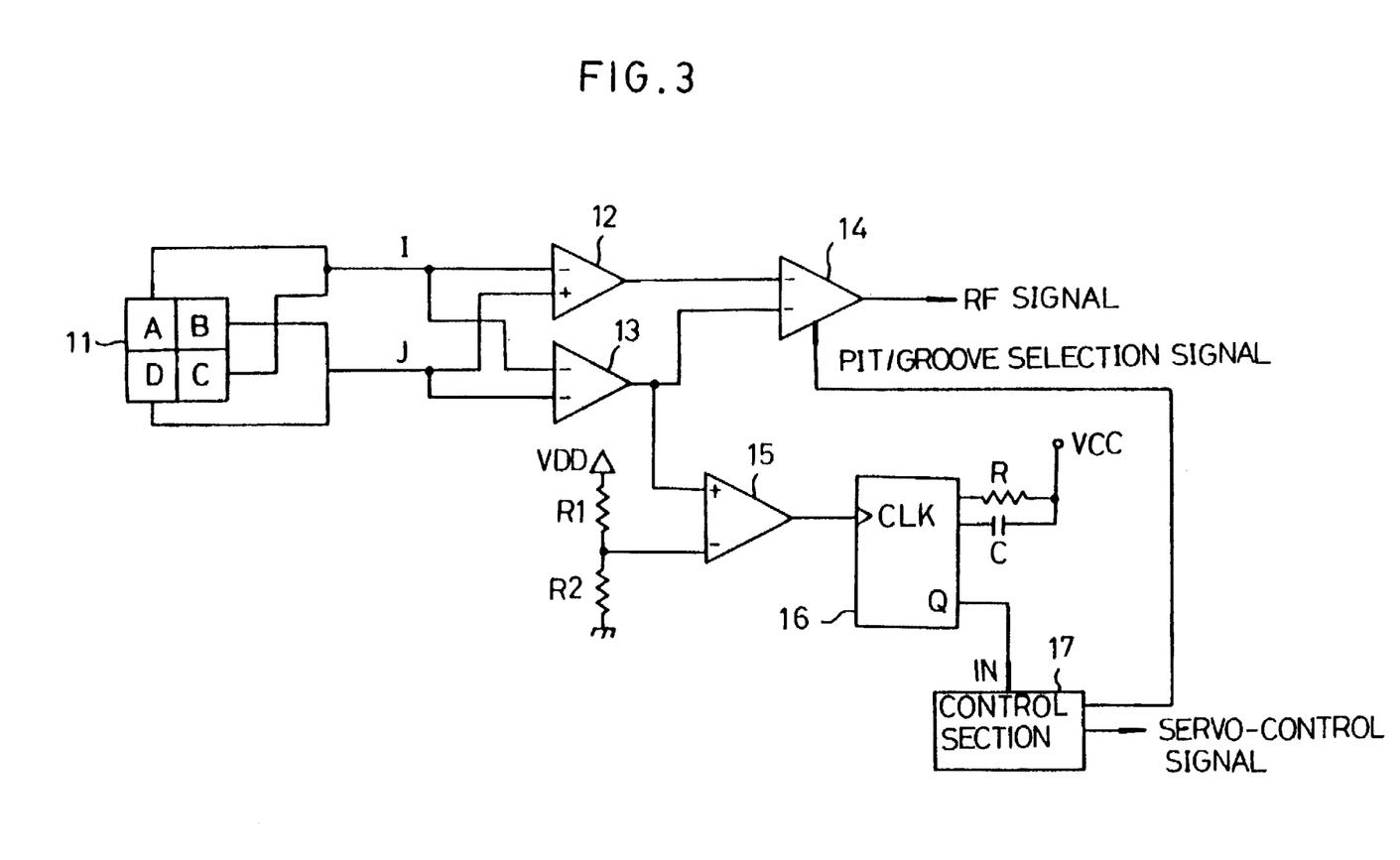
FIG. 3 is a circuit block diagram for showing a servo control apparatus for an opto-magnetic disc according to one embodiment of the present invention.

FIG. 3 is a circuit block diagram for showing a servo control apparatus for an opto-magnetic disc according to one embodiment of the present invention. Similarly, as shown in FIG. 1, a photo diode 11, having the structure of four divisions, is utilized as a light receiving device. A light receiving area is divided into areas A, B, C and D. Here, a value of a sum of light receiving areas A and C is set to I, and a value of a sum of light receiving area B and D is set to J. A first servo error detector 12 utilizes I and J values and detects a first servo error signal (e.g., a tracking error signal) in a program area formed in a groove pattern. A second servo error detector 13 is supplied with a gain control signal differential according to the disc and detects a second servo error signal (e.g., focusing error signal) in a read-in area (TOC area) formed in a pit pattern on the basis of the I and J values. An amplifier 14, connected to outputs of first and second servo error detectors 12 and 13, inputs a pit/groove selection signal from a control section 17 to be enabled and selectively amplifies the first and second servo error detection signals of both first and second servo error detectors 12 and 13, thereby outputting an amplified first and second servo error detection signals.

A comparator 15 has a non-inverting terminal (+ terminal) connected to a first output terminal of second servo error detector 13, and an inverting terminal (− terminal) of comparator 15 is connected between voltage dividing resistors R1 and R2. Comparator 15 inputs the second servo error detecting signal from second servo error detector 13 via the non-inverting terminal, and inputs a reference signal formed by voltage dividing resistors R1 and R2 via the inverting terminal. Comparator 15 determines whether or not the level of the second servo error detector 13 is larger than a predetermined reference signal (e.g., a signal having the level which is larger than a noise level), and detects a level change, thereby producing a level change signal.

A sock oscillator 16 has a trigger terminal CLK connected to an output terminal of comparator 15 and an input terminal connected to an oscillation power supply terminal Vcc via time constant elements R and C. When the level change of the second servo error detection signal from second servo error detector 13 is detected so that the trigger terminal CLK inputs a level change signal from comparator 15 (i.e., when trigger terminal CLK is triggered), a clock signal $\tau$ of a predetermined level is outputted for a time determined by constant elements R and C.

Clock signal $\tau$ from clock oscillator 16 is outputted in the range that $44T>\tau>22T$ (where a reference symbol T denotes the maximum pit length of the opto-magnetic disc). 11T (approximately 5,094 μS) is the length of the longest pit among the pits formed in the read-in area of the opto-magnetic disc, and a pit succeeding the pit of 11T long is separated from the preceding pit by the length corresponding to 11T. With at least 22T in the opto-magnetic disc, a synchronizing signal with respect to a succeeding signal pattern can be detected, so that is preferable to produce the clock signal in the above-stated range from clock oscillator 16.

A control section 17 is connected to an output terminal of clock oscillator 16. When clock signal $\tau$, from an output terminal Q of clock oscillator 16, of the predetermined level is applied to an input terminal I of control section 17 while executing the servo control operation related to the program area having the data recorded thereon with in the groove pattern by means of first servo error detector 12, control section 17 recognizes the supply of the clock signal $\tau$ as a state in which the current servo area is abruptly changed. Accordingly, outputted is the servo control signal to convert the servo control operation, which is currently executed, into the servo control operation corresponding to the changed area (especially, the read-in area having the data recorded thereon in the pit pattern).

Hereinafter, a servo control methods utilizing the servo control apparatus for the opto-magnetic disc, having the above-mentioned circuit configuration, will be described along with the operation of the servo control apparatus.

EMBODIMENT 1

Figure 4:
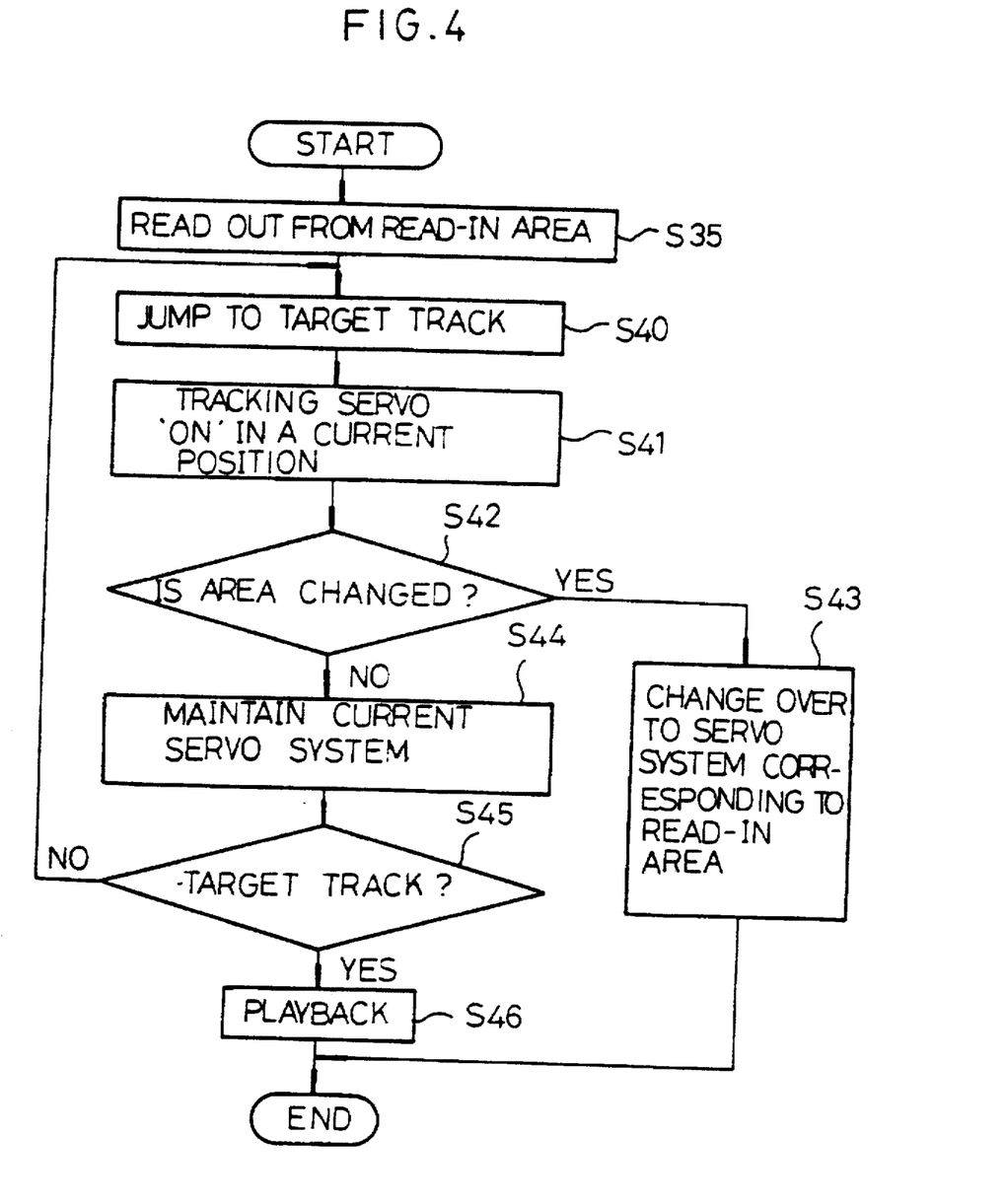
FIG. 4 is a flow chart for illustrating one embodiment of a servo control method utilizing the servo control apparatus for the opto-magnetic disc shown in FIG. 3.

FIG. 4 is a flow chart for illustrating one embodiment of a servo control method utilizing the servo control apparatus for the opto-magnetic disc shown in FIG. 3. First, the servo control operation is executed so as to reproduce predetermined data from the program area in accordance with a user's command.

When the opto-magnetic disc reproducing apparatus completes the readout operation of information from the read-in area (S35), the servo control apparatus jumps, for a predetermined time, from the outermost circumference portion of the read in area to the program area in order to execute the tracking operation with respect to an optional target track located in the program area (S40). Control section 17 sets the servo system related to the program area and supplies the groove selection signal to amplifier 14, thereby controlling amplifier 14 to input only the first servo error detecting signal from first servo error detector 12. Therefore, the tracking servo operation is carried out by the servo control apparatus which jumps to the program area, so that amplifier 14 amplifies the first servo error detection signal from first servo error detector 12 in response to the predetermined signal (I minus J signal) in accordance with the state of the laser beam converging on photo diode 11 and outputs the amplified first servo error detection signal (S41).

Control section 17 judges whether or not the area has changed from the jumped program area to a different area (S42). In step S42, when clock signal $\tau$ from clock oscillator 16 is inputted to control section 17 via input terminal I thereof for the predetermined time (i.e., $44T>\tau>22T$), control section 17 recognizes that the current servo area has changed from the program area to the read-in area due either to an external shock or to an excessive tracking operation. Then, control section 17 converts the servo system of the servo control apparatus to the servo system corresponding to the read-in area (S43). At this time, amplifier 14 is supplied with the second servo error detection signal from second servo error detector 13 by the pit selection signal from control section 17.

If control section 17 determines, in step S42, that the area has not changed on the basis of the state that the first servo error detection signal from first servo error detector 12 is continuously outputted to amplifier 14, then control section 17 maintains the current servo system unchanged (S44).

Control section 17 judges whether or not the jumped position is the position of the target track (S45). If it is judged, in step S45, that the position, to which the servo control apparatus jumps, is not the position of the target track (i.e., if the servo control apparatus jumps ahead or behind the target track), control section 17 returns to step S40 and repeatedly executes the operation after step S40. If it is judged, in step S45, that the servo control apparatus jumps to the accurate target track, control section 17 controls, in step 46, to execute the information playback operation at the corresponding position.

EMBODIMENT 2

Figure 5:
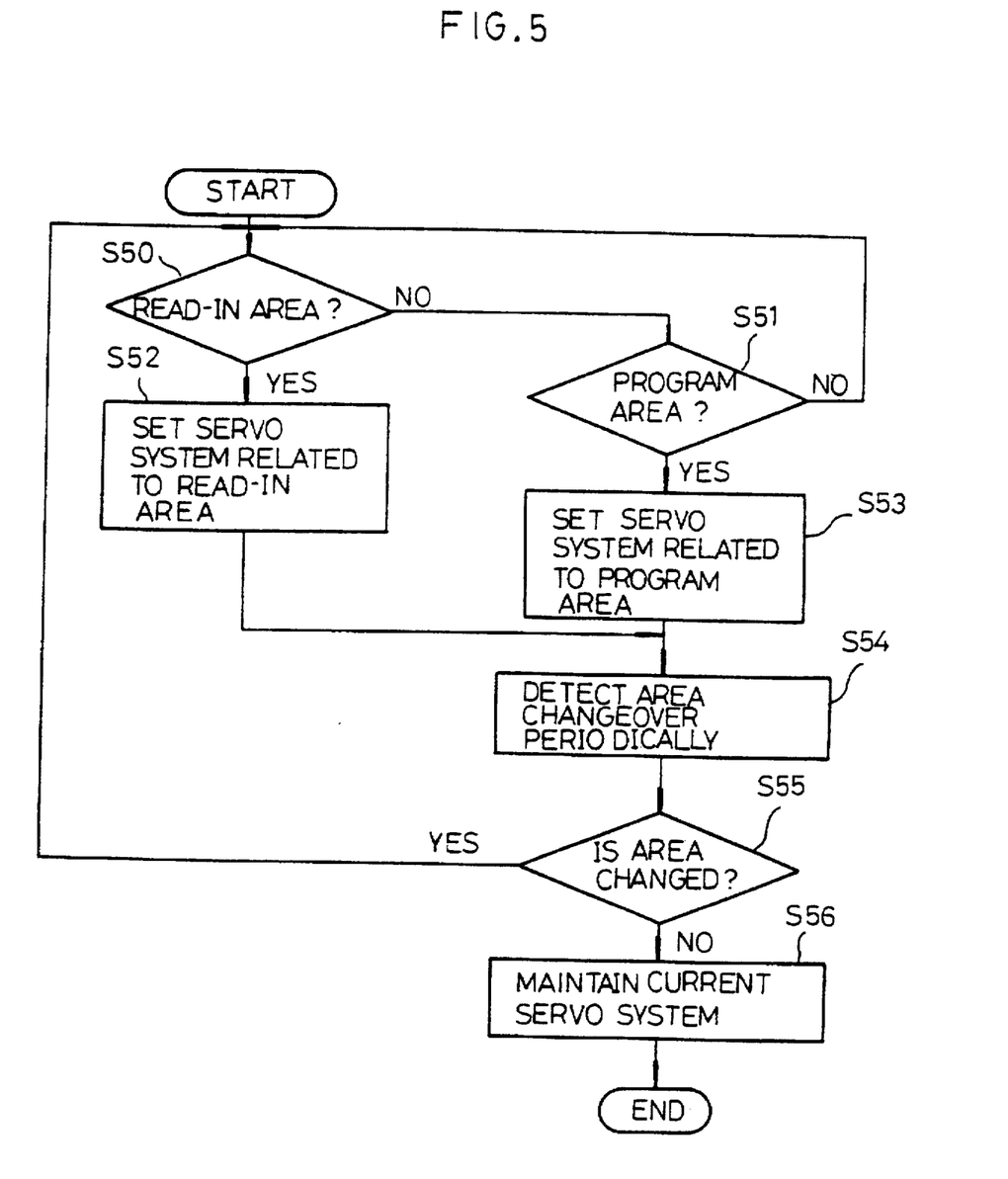
FIG. 5 is a flow chart for illustrating another embodiment of the servo control method utilizing the servo control apparatus for the opto-magnetic disc shown in FIG. 3.

FIG. 5 is a flow chart for illustrating another embodiment of the servo control method utilizing the servo control apparatus for the opto-magnetic disc shown in FIG. 3.

In the servo control method for the opto-magnetic disc according to the embodiment 1, control section 17 controls to maintain the servo system related to the program area when clock signal $\tau$ of the predetermined level is applied from clock oscillator 6 to input terminal I thereof. Meanwhile, in the servo control method for the opto-magnetic disc according to the embodiment 2, with the first servo error detector 12 control section 17 periodically checks whether or not the current servo area has changed over to a different area (particularly, the TOC area having the data recorded thereon in the pit pattern) while the servo control operation is executed with respect to the program area having the information recorded thereon in the groove pattern. When clock signal $\tau$ of the predetermined level is applied from clock oscillator 16 to input terminal I of control section 17, control section 27 recognizes the supply of clock signal τ as the area change state and controls the servo control operation to be normally maintained in the changed area. Also, control section 17 periodically checks whether or not the area has changed while executing the servo control operation in the changed area (read-in area). If it is judged that the current servo area has again changed to the program area, control section 17 controls to maintain the servo system related to the program area.

When the power of the opto-magnetic disc reproducing apparatus is 'ON', and the servo operation is executed, control section 17 judges whether or not the current servo area is the read-in area having the data recorded thereon in the pit pattern (S50).

In order to execute the operation of determining the read-in area, control section 17 applies the pit selection signal to amplifier 14 and controls amplifier 14 to input the second servo error detection signal from second servo error detector 13. Once the second servo error detection signal is outputted from second servo error detector 13, the level change signal from comparator 15 is inputted to clock oscillator 16 which is then triggered to provide predetermined clock signal τ to control section 17 via input terminal I thereof for the predetermined time (i.e., 44T>τ>22T). Control section 17 judges whether or not the current servo area is the read-in area in response to the input state through input terminal I thereof. That is, if clock signal τ from clock oscillator 16 is not inputted to input terminal I of control section 17 (e.g., in case there is no laser beam converging on photo diode 11), control section 17 judges that the current servo area is not the read-in area. When the clock signal from clock oscillator 16 is applied to control section 17, it is judged that the current servo area is the read-in area.

If control section 17 judges, in step S50, that the current servo area is not the read-in area, control section 17 judges whether or not the current servo area is the program area having the data recorded thereon in the groove pattern (S51). Then, in order to execute the operation in step S51, control section 17 applies the groove selection signal to amplifier 14 to control amplifier 14 to input the first servo error detection signal from first error detector 12. Consequently, control section 17 judges that the current servo area is the program area in case there exists the first servo error detection signal from first servo error detector 12, which is then amplified by amplifier 14. Also, if there is no first servo error detection signal, control section 17 judges that the current servo area is not the program area.

After step S51, when control section 17 judges that the current servo area is not the program area (i.e., when the RF signal from amplifier 14 is not provided since there exists no the laser beam converging on photo diode 11), control section 17 returns to step S50, thereby repeatedly executing the succeeding operation.

If it is judged, in step S50, that the current servo area is the read-in area since clock signal τ is applied from clock oscillator 16 to control section 17, control section 17 sets the servo system related to the read-in area (S52).

If it is judged, in step S51, that the current servo area is the read-in area, control section 17 sets the servo system related to the program area (S53).

After steps S52 or S53, in the state in which control section 17 sets the servo system related to the read-in area or the program area, control section 17 periodically detects the area change state while executing the servo control operation related to the corresponding area (S54). Namely, control section 17 judges that the current servo area is changed when clock signal τ of the predetermined level is applied from clock oscillator 16 to control section 17 for the predetermined time in case of the servo system related to the read-in area. Also, control section 17 judges that the current servo area has changed when clock signal τ is not applied to input terminal IN of control section 17 in case of the servo system related to the program area.

Control section 17 periodically checks the state of clock signal τ which is applied to input terminal IN of control section 17, thereby recognizing whether or not the current servo area has changed (S55). When control section 17 judges that the current servo area has changed while executing the servo control operation in response to the operation of checking the area change state as above, control section 17 controls returns to step S50 and repeatedly executes the succeeding operation. Also, if the current servo area is not changed while executing the servo control operation (i.e., if it is not changed whether or not the clock signal τ is applied from clock oscillator 16 to input terminal IN of control section 17), control section 17 controls to maintain the current servo system unchanged (S56).

According to the present invention, if the current servo area has changed to a different area due to an external shock or an excessive tracking operation while the servo control operation is executed via an optional servo system, it is swiftly adjusted to the servo system related to the changed area. As a result, when the servo area changes, the time required to resume the servo control operation is reduced, so that the servo control operation can be efficiently executed.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. The servo control apparatus for an opto-magnetic disc, said apparatus comprising:

a first servo error detector for detecting a first servo error signal in a first area on the basis of a converging state of a light receiving device;

a second servo error detector for inputting a gain control signal differential according to a kind of disc and detecting a second servo error signal in a second area on the basis of a converging state of the light receiving device;

an amplifier for selectively amplifying the first and second servo error detection signals from the first and second servo error detectors and outputting an amplified first and second servo error detection signals;

a comparator for detecting a level change of the second servo error detection signal from the second servo error detector by means of a predetermined reference signal and producing a level change signal;

a clock oscillator for outputting a clock signal having a predetermined level for a predetermined time, by means of the level change signal from the comparator when the level change of the second servo error detector is detected; and a control section for receiving said clock signal and sending a predetermined signal to control the amplifier and change a current servo operation into another servo operation.

2. A servo control apparatus for an opto-magnetic disc as claimed in claim 1, wherein said clock signal from said clock oscillator is produced within a range of being greater than 22T and smaller than 44T where T denotes the maximum pit length of said opto-magnetic disc.

3. A servo control apparatus for an opto-magnetic disc as claimed in claim 1, wherein said light receiving device is a photo diode consists of at least four elements.

4. A servo control apparatus for an opto-magnetic disc as claimed in claim 1, wherein said first area is a program area recorded with information, and said second area is a read-in area recorded with address information.

5. A servo control apparatus for an opto-magnetic disc as claimed in claim 1, wherein said first servo error signal is a tracking error signal, and said second servo error signal is a focusing error signal.

* * * * *